United States Patent [19]
Varini

[11] 3,949,044
[45] Apr. 6, 1976

[54] PROCESS FOR FORMING DECORATED SHEETS OF ACRYLIC RESIN

[76] Inventor: Adelchi Varini, Piazzale Stazione 6, Padova, Italy

[22] Filed: June 13, 1973

[21] Appl. No.: 369,591

[30] Foreign Application Priority Data

Oct. 24, 1972 Italy ........ 41684/72

[52] U.S. Cl. ........ 264/245; 264/247
[51] Int. Cl.² ........ B29C 9/00
[58] Field of Search ........ 264/245, 246, 247, 132, 264/255; 117/33.3

[56] References Cited

UNITED STATES PATENTS

| | | | |
|---|---|---|---|
| 2,622,991 | 12/1952 | Sturm | 264/246 |
| 3,342,668 | 9/1967 | Dario | 264/246 |
| 3,415,670 | 12/1968 | McDonald | 117/33.3 |
| 3,784,664 | 1/1974 | Nicklin | 264/132 |

FOREIGN PATENTS OR APPLICATIONS

| | | | |
|---|---|---|---|
| 566,474 | 1/1945 | United Kingdom | 264/132 |
| 770,462 | 3/1957 | United Kingdom | 264/246 |

*Primary Examiner*—Robert F. White
*Assistant Examiner*—T. E. Balhoff
*Attorney, Agent, or Firm*—Cushman, Darby & Cushman

[57] ABSTRACT

A process is disclosed for forming decorated articles of acrylic resins, more particularly acrylic sheets bearing figures and inscriptions, according to which a molding cell, having one of its inner faces coated with a coloured paint reproducing the desired inscriptions or decorations, is filled with an acrylic prepolymer in admixture with a polymerization catalysts, the polymerization is carried out in a controlled temperature environment until the polymer is still ductile, and then the polymer mass incorporating the coloured paint coating is placed in a second molding cell of greater inner size, the space remaining between the outer surfaces of the polymer mass and the inner faces of said second cell is filled with additional mixture of acrylic prepolymer and catalysts, and then the polymerization process is completed under controlled temperature, whereby the required figures or inscriptions are incorporated in the acrylic body.

3 Claims, No Drawings

PROCESS FOR FORMING DECORATED SHEETS OF ACRYLIC RESIN

Acrylic materials are used to an increasingly greater degree in the construction of number plates, luminous signs, panels and the like carrying figures and inscriptions. Prior to the process described in the French patent No. 1359401, in order to affix decorations or inscriptions to sheets of acrylic derivatives, one side of the sheet was painted with the desired subject so that it could be observed by transparency. The disadvantages of this manufacturing process are evident. The sheets so obtained deteriorate with time as the inscription or decoration has no protection against atmospheric agents. By the process described in the aforementioned French patent, this problem was originally obviated by acting directly during the process of forming the sheet rather than on the already formed sheet of acrylic material. This is carried out by applying coloured paints reproducing the inscriptions or decorations to one or both the faces of the cell to be used for forming the sheet, so that during the polymerisation process the paints become separated from the die and become incorporated in the sheets so formed, so becoming protected by a thin layer of polymer. The materials used in the process for forming sheets decorated in this manner are known and described in the aforementioned patent. They comprise the esters of acrylic and methacrylic acid suitably mixed with a catalyst and possibly a plasticiser, and paints suitable for the process because of their characteristics of stability and permeability to the polymer and catalyst. Particularly suitable for use for inscriptions or decorations are mineral and organic pigments dispersed in solutions of resins (for example the product known as Resiprene 35 PA) which possess the property of forming a layer stable to the influence of the acrylic materials during the polymerisation process. Among solvents suitable for this purpose are ethane, benzol, trichlorethylene and mineral turpentine.

When for example the inscriptions or decorations have been suitably prepared by silk-screen or manual processes on the sheet forming one wall of the polymerisation cell, they are allowed to dry and then the polymer is introduced with the results heretofore described.

The products thus obtained, although having excellent qualities, have shown the following disadvantages.

The coloured decorations and inscriptions embedded in the sheet during its formation process lie very close to the surface at a depth of a few tenths of a millimeter. Consequently although they are protected in comparison with those obtained by traditional systems of decoration after formation of the sheets, they tend to deteriorate under the action of atmospheric agents and mechanical stresses and thus lose their original brilliance.

In particular the negative action of some light on paint pigments of the organic type is well known, and this evidently influences the brilliance and vivacity of the images. It has been sought to obviate this by using anti U.V. agents applied to the finished product. In fact because of the small layer of protection which the polymer gives to the inscriptions or decorations, it would be uneconomical to introduce the anti U.V. agent into the starting mixture as only a small part of it would carry out its function because of the fact that it becomes dispersed throughout the entire volume of the sheet. Varnishes containing the agent were thus manufactured for manual or machine application to the surface of the finished product. This latter finishing stage of the product however results in a lengthening of production times due to the need to dry and polish the product, to difficulties in its application and subsequently to possible flaking and decomposition of the protective film.

In the production of the incorporating sheet it can arise that because of non-homogeneous polymerisation, surface irregularities appear over the entire surface of the sheet and damage the finished product, so making it unsaleable. Moreover if the sheet so obtained is machined, account must be taken of the small protection layer.

The object of the present invention is to obviate the aforementioned disadvantages and to allow a finished product to be obtained which is more resistant to atmospheric agents at relatively low fabrication costs.

This object is attained by the process according to the invention which comprises the steps of applying to at least one of the inner faces of a cell used for forming the sheet a coloured paint reproducing the desired inscriptions or decorations, filling the cell with an acrylic prepolymer mixed with a catalyst and carrying out polymerisation in a temperature controlled environment, and in which the polymerisation process is interrupted after completion of the process of incorporation of the layer of coloured paint in the sheet while the polymer is still ductile, the sheet is extracted from the cell and is placed in a second cell of greater internal dimensions than the first, the interspace between the inner wall of this second cell and the sheet is filled with the same acrylic prepolymer as used previously and the polymerisation process is finished by introducing the second cell into a temperature controlled environment.

One particular embodiment of the process according to the invention is described hereinafter.

When the desired inscription or decoration has been applied to one of the sheets of glass constituting the first polymerisation cell using the noted processes and materials, the cell is filled with prepolymerised methylmethacrylate and a catalyst and possible additives (plasticiser, stearine) and the whole is placed in a temperature controlled atmosphere at a temperature and for a time which can vary.

It remains until the polymer, although having completed the process of incorporation of the coloured layer, has not yet reached the consistency of the finished product and is still very ductile. At this point the cell and product are extracted from the bath with a constant interruption of the polymerisation process. The sheet thus formed is extracted from the first cell and is placed in a second cell having a thickness greater than the previous cell, as determined by requirements. The same substance as used previously for forming the sheet is introduced into the interspace between the glass sheet forming the wall of the second cell and the decorated face of the sheet, together with an anti U.V. agent of known type (e.g. one of the products known commercially by the names "CHIMASORB 90" or "CYASORB-UV9") and the whole is again introduced into the temperature controlled environment until polymerisation is complete. The surface of the glass facing the decorated face may be either smooth or totally or partially matt to give a consequent effect in the protection and covering layer which thus becomes either smooth or infrangible. The product is then subjected to a further stage of baking in an oven in accordance with known processes. The sheet thus formed is entirely homogeneous with respect to the layer incorporating the decoration and the protection layer.

The following practical example of the process helps to clarify the results.

It is supposed that an acrylic sheet decorated with inscriptions or figures and 4 mm thick is to be made. The first cell is prepared consisting of two coupled glass sheets with an interspace of 2.5 mm, obtained by a perimetral cord of PVC, the relative decorations being applied to the inner surface of at least one of the two glass sheets in accordance with the noted process. The cell is filled with prepolymer with a catalyst and is immersed in a temperature controlled environment at a temperature variable from 45° to 60°C for a period variable from four to six hours, which is a time sufficient to partially polymerise and incorporate the inscription or decoration.

After this the assembly is extracted from the temperature controlled environment and a second cell is formed with an interspace of 1.5 mm between the decorated face of the sheet and the facing glass, which may be smooth or matt, and this is filled with the prepolymer mixed with the known anti U.V. agent in the proportion of 3–4 parts per thousand. The cell is replaced in the temperature controlled environment and the polymerisation process becomes completed, which on an average takes 5–6 hours at 50°C.

The final product thus consists of a single homgeneous sheet comprising the inscription or decoration embedded at a depth of 1.50 mm, formed by a single production process.

The product so obtained obviates the aforementioned disadvantages. The larger protection layer, the thickness of which may vary from approximately 1 to 2 mm according to the thickness of the whole sheet and which can be chosen according to requirements, gives a higher resistance to mechanical and atmospheric agents. The introduction of a suitable quantity of anti U.V. agent into the prepolymerised protection monomer in the second stage of the cycle avoids the stated complex protection operations using varnishes and all the connected disadvantages. The greater protection layer entirely eliminates the formation of imperfections so making the final product always commercially saleable. The greater quantity of protection polymer for the colour enables the sheet or panel to be machined to a greater extent so making it suitable for more complex uses. For example the considerable protection layer obviates the disadvantage of deep scoring of the decorated face of the sheet. As manufacture is carried out in a single simple and economical production cycle, considerable economies of time and labour are obtained.

What is claimed is:

1. A process for forming decorated sheets of acrylic resin comprising the steps of applying to at least one of the inner faces of a cell used for forming the sheet a colored paint reproducing the desired inscriptions or decorations, filling the cell with an acrylic prepolymer mixed with a catalyst, partially carrying out polymerization in a temperature controlled environment to effect incorporation of the colored paint layer in the sheet, interrupting the polymerization process after completion of the process of incorporation of the layer of colored paint in the sheet, extracting the sheet while the sheet is still ductile, placing the sheet in a second cell of greater internal dimensions than the first cell with the portion of the sheet which carries the colored paint exposed, filling the interspace between the inner wall of this second cell and the sheet with the same acrylic prepolymer as used previously and finishing the polymerization process by introducing the second cell into a temperature controlled environment.

2. A process as claimed in claim 1, in which an anti U.V. agent is added to the acrylic prepolymer used for filling the interspace formed in said second cell.

3. A process as claimed in claim 1, in which the walls of said second cell are matted.

* * * * *